March 22, 1932. I. W. MUNDEN 1,850,212
WHEEL ALIGNING GAUGE
Filed Oct. 10, 1929
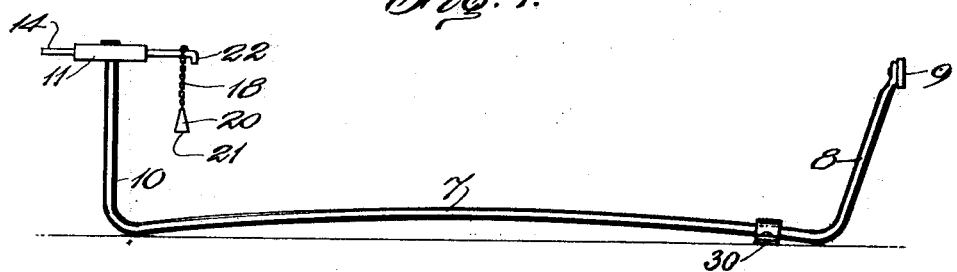
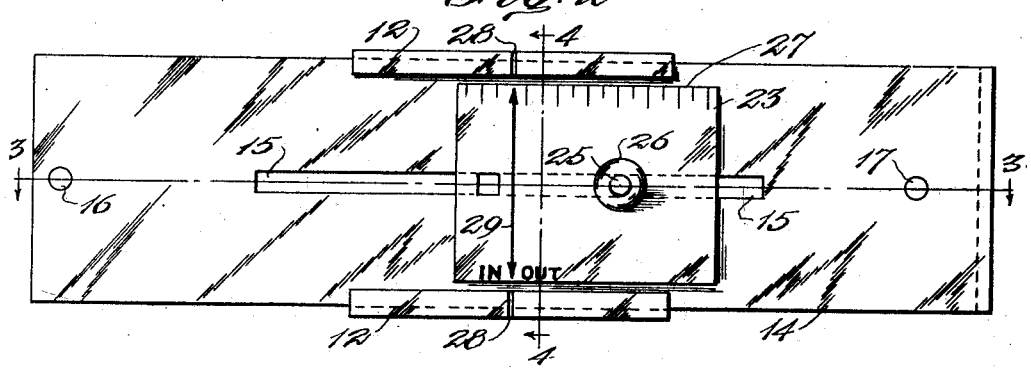
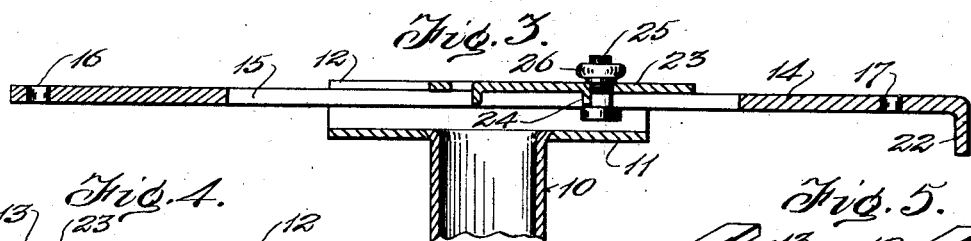
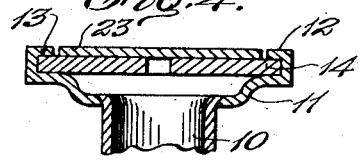
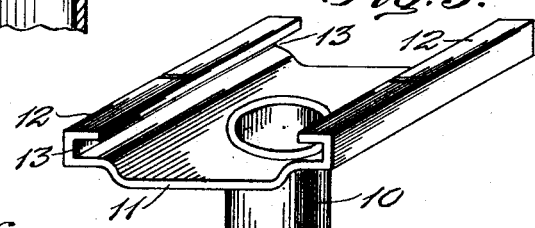
INVENTOR,
I. W. Munden.
BY
Sterling P. Buck,
ATTORNEY.

Patented Mar. 22, 1932

1,850,212

UNITED STATES PATENT OFFICE

ISAAC W. MUNDEN, OF TAMPA, FLORIDA

WHEEL ALIGNING GAUGE

Application filed October 10, 1929. Serial No. 398,668.

This invention relates to wheel aligning gauges, and especially to certain improvements upon my invention shown in my Patent Number 1,701,050.

One object of this invention is to provide a wheel aligning gauge by which the wheels of an automobile can be gauged or tested for turning radius alignment, as well as straight alignment. For elucidating the foregoing statement, it may be well to explain that when an automobile is travelling in a straight line, its wheels are presumed to be in straight alignment; but when the machine is turning around a curve, or when its wheels are in a position for turning around a curve, its front wheels are said to be in "turning radius alignment". When the front wheels are turning around a curve, the front wheel at the inside of the curve is describing a smaller circle or arc than the front wheel in the outside of the curve, and consequently, the slant of angularity of the inside wheel, with respect to the straight alignment position, is greater than the slant or angularity of the outside front wheel. Proper steering construction provides for this difference of angularity between the front wheels, when in the turning radius alignment, but such construction may become defective, and therefore, there is a necessity for determining or gauging the existing relation of the front wheels to one another, and indicating the extent of adjustment necessary to overcome the maladjustment.

Another object, therefore, is to generally improve upon my previously patented invention, above mentioned, without sacrificing any of the advantages obtained by such previously patented invention, and without materially increasing the cost of manufacturing such devices.

Other objects and important features are pointed out or implied in the following details of description, in connection with the accompanying drawings in which:

Figure 1 is a side elevation of a wheel aligning gauge constructed in accordance with the present invention.

Figure 2 is an enlarged detail plan view of certain parts shown at the left end of Figure 1.

Figure 3 is a vertical sectional view along the line 3—3 of Figure 2.

Figure 4 is a vertical sectional view along the line 4—4 of Figure 2.

Figure 5 is a perspective or isometric view of the supporting and guiding end of the main body or base member.

Figure 6 is an enlarged view of the flexible gauging element shown depending at the left end of Figure 1.

Referring to these drawings in detail, in which similar reference characters correspond to similar parts in the several views, the invention is now described in detail as follows:

A main base member or body, formed of a length of tubing, includes a substantially horizontal part 7 which is upwardly bowed, so its end portions may rest firmly on a floor or pavement which may be more or less uneven. The end portions of this body are turned upward or in the direction of the bend of the part 7, one of these upright parts being shown at 8, and having a contacting plate 9 thereon for contacting with the inner side of a tire, while the other contacting element (presently described) contacts with the outer side of the tire of the opposite wheel of an automobile.

The upright part 10 of the main body member is united with a supporting plate 11, preferably in the manner shown herein, and described in my patent above referred to. This plate 11 has upwardly and inwardly turned flanges 12 which form grooves 13 in which a gauging member 14 has its edges seated for sliding movement while being retained and guided by the flanges 12. This member 14 has a longitudinal slot 15 extending through its central part, and terminating a distance from each end of the member 14. The outer end of the member 14 has an opening 16 through which a bolt, cotter-key, or other member may be inserted to prevent the member 14 from moving too far to the right with respect to the part 11. An opening 17 is provided in the inner end portion of the member 14, and through this opening, a chain or other appropriate flexible element 18 extends, a securing member 19 being provided on the end of this chain to prevent accidental displacement of the chain from the opening 17. A gauging element or plate 20 is secured on the opposite end of the chain from the member 19, and its contour is preferably triangular, and one of its straight edges, 21, may hereinafter be referred to as a gauging or contacting edge. The member 14 is also formed with a gauging or contacting edge, end, or surface, as indicated at 22.

An auxiliary gauging member or plate is shown at 23, in Figures 2, 3 and 4, and this member has guiding tongues or lugs 24 which extend into the slot 15 and prevent lateral movement of the member 23 with respect to the member 14, while permitting longitudinal movement of these members 14 and 23 with respect to one another. A headed screw 25 also extends through the slot 15 and through an opening of the member 23, and has a thumb nut 26 which combines with the head of the screw 25 for clamping the member 23 in any one of an infinite number of adjusted positions on the member 14. One edge of the member 23 is graduated, as indicated at 27, and these graduations or index markings are adapted to be moved into and out of registration with notches or index markings 28 which are located at opposite sides of the middle parts of the flanges 12. An index element 29 is provided on the member 23, such index element being here shown as an arrow having pointed arrow heads at its opposite ends, the points of these arrow heads being adapted to register with the index markings 28.

The manner of using this device is as follows:

In testing or gauging wheels for straight alignment, the operation is practically identical with that explained in the above mentioned prior patent, and consists in placing the device on the ground or floor at the front of the wheels with the ends upright, being held in that position by the aid of a foot-piece 30, so that the contact surface 9 rests against the inner side-wall of one of the tires on one of the front wheels, and the contact surface 22 comes out just beyond the outer side-wall of the tire on the opposite front wheel while the wheels are pointed straight forward with respect to the vehicle. Now slide the gauging member 14 forward until the contact surface 22 rests against the outer side-wall of the tire, and while in that position slide the auxiliary gauging plate 23 to where the double-pointed arrow 29 stops even with the two index marks 28, and tighten the thumbscrew 25; a visible mark is now made on the tire with chalk or pencil at the spot where the contact surface 22 touches it, then the device is removed and the automobile is rolled forward or backward until the marked spot on the tire comes over on the opposite side of the hub and stops at approximately the same distance from the floor as it was in the first instance; and now the device is placed in a similar position at the rear of the wheels, the two contacting surfaces 9 and 22 being set against the inner and outer sidewalls of the respective tires, substantially at the mark which was made on the tire before the wheels were turned; and finally, a reading of the alignment, or misalignment as the case may be, is taken by comparing the position of the arrow-points 29 with the two index marks 28, one side showing "In" or "Out" and the other side specifying the same in fractions of an inch.

Having completed the gauging of the wheels with respect to straight alignment, the operations is continued to determine whether or not the wheels are properly aligned with respect to turning radius. With the wheels pointed straight forward, a record of the distance between the front of the wheels is taken from tire-wall to tire-wall the same as if intending to test for straight alignment. Now turn or cut the wheels sidewise (away from the contacting gauge surfaces) just far enough to enable the contacting edge 21 to touch the outer side of the tire against which the gauge surface 22 just previously rested, while the chain 18 is extended its full length over the contacting part 22, and while the indicating elements 28 and 29 are in registration. Next, move the entire device into the proper position for testing the distance across from one to the other of the front wheels while in this turned or cut position, using the contacting surfaces 9 and 22, and the wheel alignment or amount of non-alignment with respect to the turning radius will be disclosed by the new reading of the scale 27 with respect to the index markings 28, taking account of the distance that the index element 29 has moved from the index elements 28. To complete the operation, first see that the wheels are pointed straight forward again, reverse the ends of the wheel aligning gauge, and by applying it to the opposite sides of the tires test the opposite turning radius in the same manner as previously described. Correctness of turning radius alignment is governed by specifications furnished relative to wheel base, and if found to be correct will of course furnish the same reading on both turns.

The object of my invention is not only to diagnose the existing condition, but to locate the cause of any discrepancy, should any exist, and also outline the remedy.

Although I have described this embodiment of my invention, specifically, it is not my intention to limit my patent protection to these exact details of construction and arrangement, for the invention is susceptible of numerous changes within the scope of the inventive ideas as implied and claimed.

What I claim as my invention is:

1. In a wheel-aligning gauge, the combination of a body member provided with a contacting end for contacting with the inner side of a tire of a vehicle, and having its other end provided with a supporting and guiding member, a gauging member slidably seated on said supporting and guiding member so as to be movable towards and from the said contacting end and to contact with the outer surface of the opposite tire of the vehicle, an auxiliary gauging element movably secured to said gauging member and adapted to be extended therefrom towards the said contacting end and to touch said outer surface and an auxiliary indexing member mounted to slide along said gauging member and provided with indexing elements and with means to secure it in different adjusted positions on said gauging member, said supporting and guiding member being provided with an indexing element for registering with the indexing elements of the auxiliary gauging element.

2. In a wheel-aligning gauge, the combination of a base provided with upright end portions one of which has a fixed tire contacting end, the other one of these upright portions having an indexing element thereon, a gauging member movably secured on the end portion that has the said indexing element thereon, said gauging member having a tire contacting end for cooperation with the first said contacting end in connection with two opposite tires to be gauged with respect to one another, an auxiliary gauging element movably secured to the said gauging member and adapted to be extended therefrom for touching one of said tires and thereby cooperating with the first said contacting end in gauging said tires, and an auxiliary indexing member mounted for movement along said gauging member and provided with an indexing element for registration with the first said indexing element, substantially as shown and specified.

3. In a wheel-aligning gauge, the combination with a base having upright end portions each provided with a tire contacting member, at least one of these tire contacting members being mounted for movement towards the other and having a longitudinal slot therein, an indexing member mounted on the slotted tire-contacting member and provided with guiding means and securing means which extend through said slot and permit the indexing member to be moved along said slotted tire contacting member and being effective for securing the indexing member in different adjustments with respect to said tire contacting member, and an auxiliary tire contacting member movably secured to said slotted tire contacting member and operable for cooperation with the first said tire contacting members substantially as specified.

4. In a wheel-aligning gauge, the combination with an elongated body provided with tire contacting members at its opposite ends for contacting with two opposite tires of a vehicle, one of these tire contacting members being mounted for movement towards the other and provided with an indexing member mounted for movement thereon towards the tire contacting end thereof, an auxiliary tire contacting member, and a chain connecting the auxiliary tire contacting member to one of the first said tire contacting members and operable for cooperation therewith in the manner specified.

In testimony whereof I affix my signature.

ISAAC W. MUNDEN.